United States Patent [19]

Sirovich et al.

[11] Patent Number: 5,595,205
[45] Date of Patent: Jan. 21, 1997

[54] METHOD OF AND APPARATUS FOR CONTROLLING TURBULENCE IN BOUNDARY LAYER AND OTHER WALL-BOUNDED FLUID FLOW FIELDS

[75] Inventors: Lawrence Sirovich, New York, N.Y.; Evgene Levich, Tel-Aviv; Lucien Y. Bronicki, Yavne, both of Israel

[73] Assignee: Orlev Scientific Computing Ltd., Yavne, Israel

[21] Appl. No.: 586,423

[22] Filed: Jan. 16, 1996

Related U.S. Application Data

[63] Continuation of Ser. No. 447,170, May 19, 1995, abandoned, which is a continuation of Ser. No. 253,134, Jun. 2, 1994, abandoned.

[51] Int. Cl.$^6$ ............................................. F15C 1/04
[52] U.S. Cl. .............................. 137/13; 137/828; 137/833
[58] Field of Search .................................. 137/827, 828, 137/833, 13

[56] References Cited

U.S. PATENT DOCUMENTS

| | | |
|---|---|---|
| 4,932,610 | 6/1990 | Maestrello . |
| 4,998,553 | 3/1991 | Schram ................................... 137/828 |
| 5,040,560 | 8/1991 | Glezer et al. ........................... 137/828 |
| 5,114,099 | 5/1992 | Gao . |

FOREIGN PATENT DOCUMENTS

| | | |
|---|---|---|
| 0212167 | 7/1986 | European Pat. Off. . |
| 0543647 | 5/1993 | European Pat. Off. . |
| 3534268 | 4/1987 | Germany . |
| 3609541 | 9/1987 | Germany . |
| 09316009 | 2/1994 | Germany . |
| 0729880 | 5/1955 | United Kingdom . |

| | | |
|---|---|---|
| WO8403867 | 10/1984 | WIPO . |

OTHER PUBLICATIONS

L. Sirovich et al. "Plane Waves and Structures in Turbulent Channel Flow", *American Institute of Physics*, Dec. 1990, pp. 2217–2226.

L. Sirovich et al. "Propagating Structures in Wall–Bounded Turbulent Flows", *Theoretical and Computational Fluid Dynamics*, pp. 307–317.

L. Sirovich et al., "Drag Reduction in Turbulent Channel Flow by Phase Randomization," *Physics of Fluids A*, vol. 5, pp. 686–694, 1993.

*Primary Examiner*—A. Michael Chambers
*Attorney, Agent, or Firm*—Donald M. Sandler

[57] ABSTRACT

Turbulence is controlled in boundary layer or wall-bounded fluid flow fields having a turbulent wall region characterized by a system of roll pairs extending in the direction of flow, and obliquely propagating structures interacting with the system of roll pairs, by locally introducing into the turbulent wall region two separate disturbances that are effective to produce, in a local region, a composite disturbance field that is strongly coupled to and modifies the obliquely propagating structures in a manner that increases or decreases the interaction of the propagating structures with the system of roll pairs thereby locally increasing or decreasing the turbulence in the flow field. One of the disturbances may result from the interaction of the fluid with a linear strip, or an array of strips, of delta-shaped protrusions positioned spanwise on the wall (i.e., transverse to the flow direction); and the second disturbance may result from injecting sonic energy into the local region. Furthermore, a linear strip or an array of airfoil shaped protrusions can be used for producing a pair of counter rotating rolls for controlling turbulence in the boundary layer.

22 Claims, 14 Drawing Sheets

FIG. 5
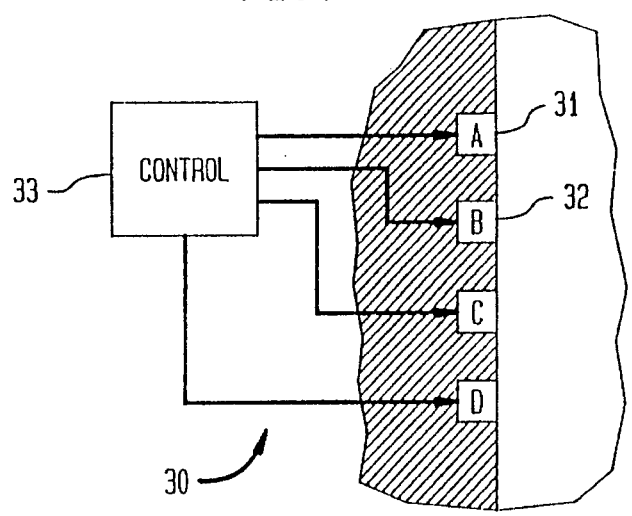
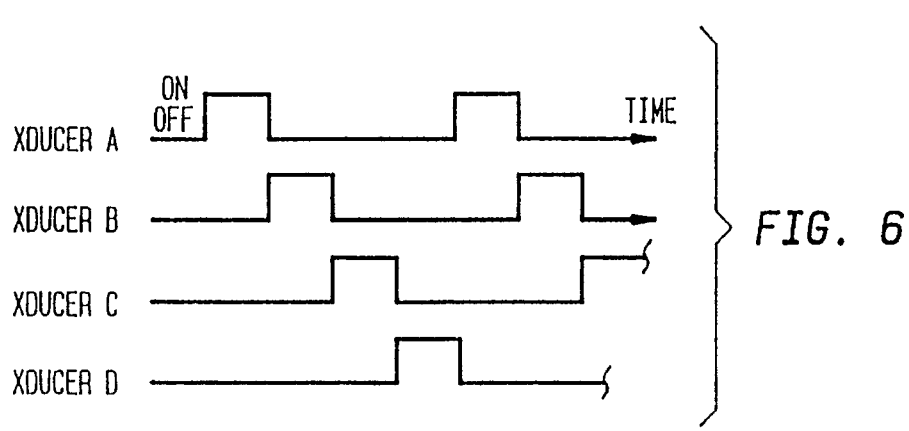
FIG. 6
FIG. 7
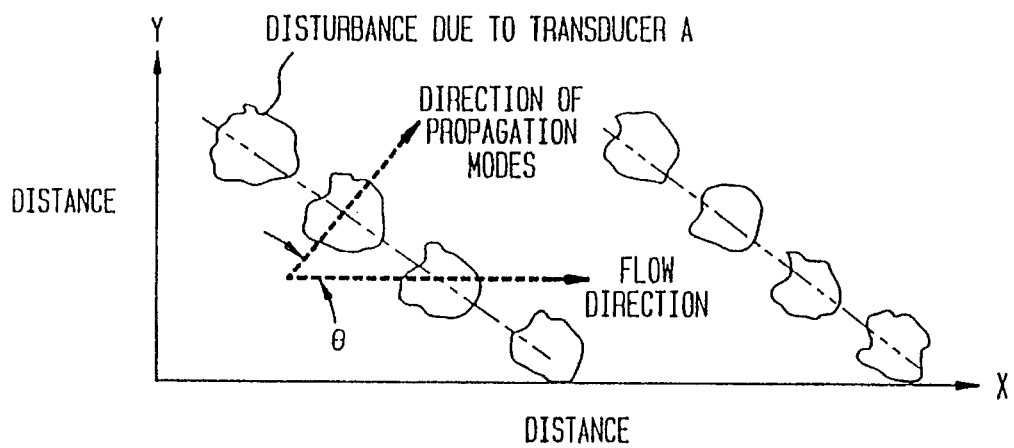

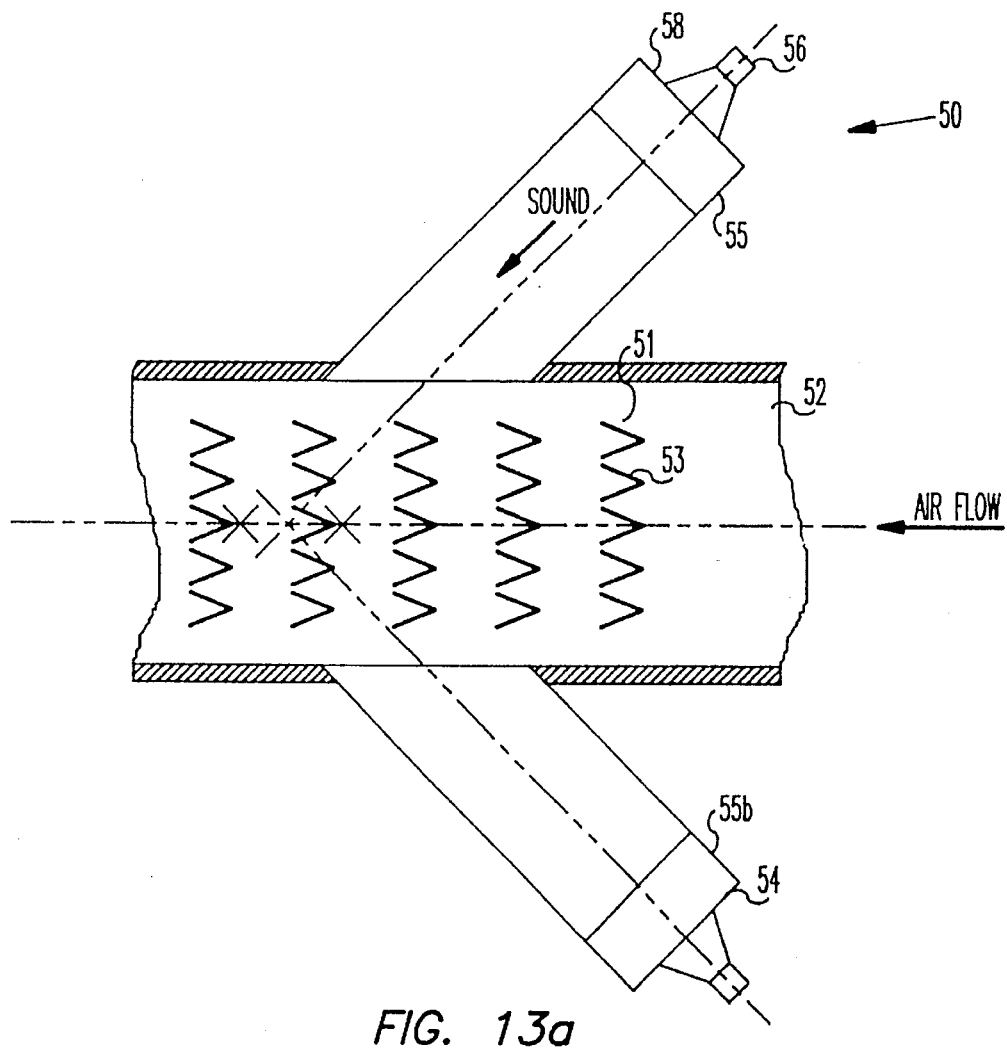
FIG. 13a
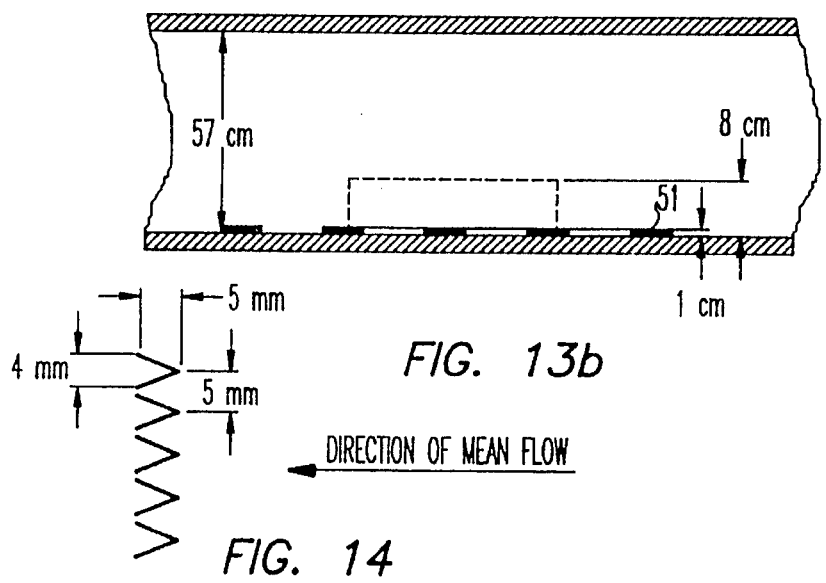
FIG. 13b
FIG. 14

FIG. 15a1
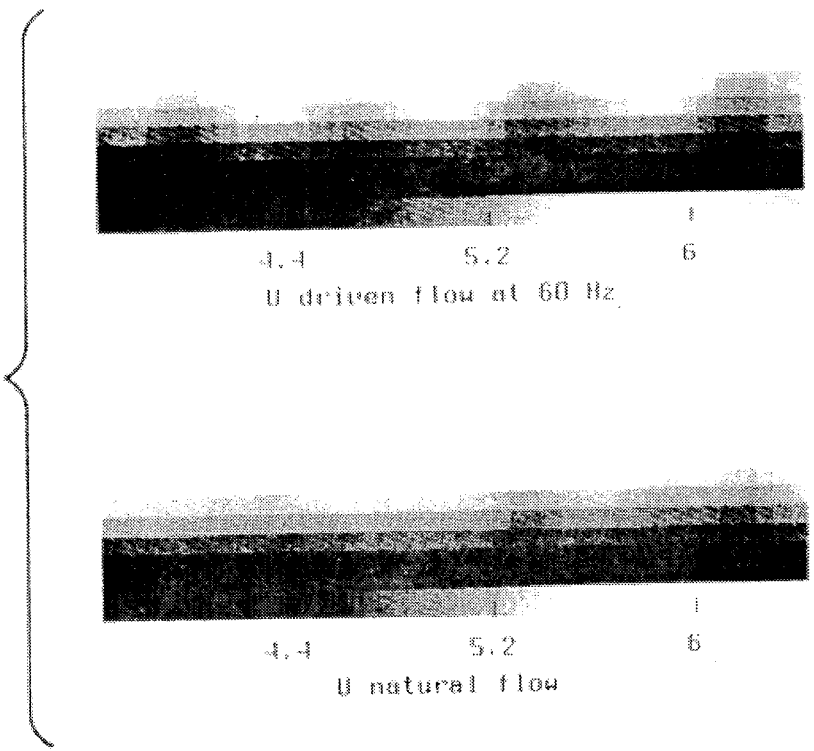
FIG. 15a2
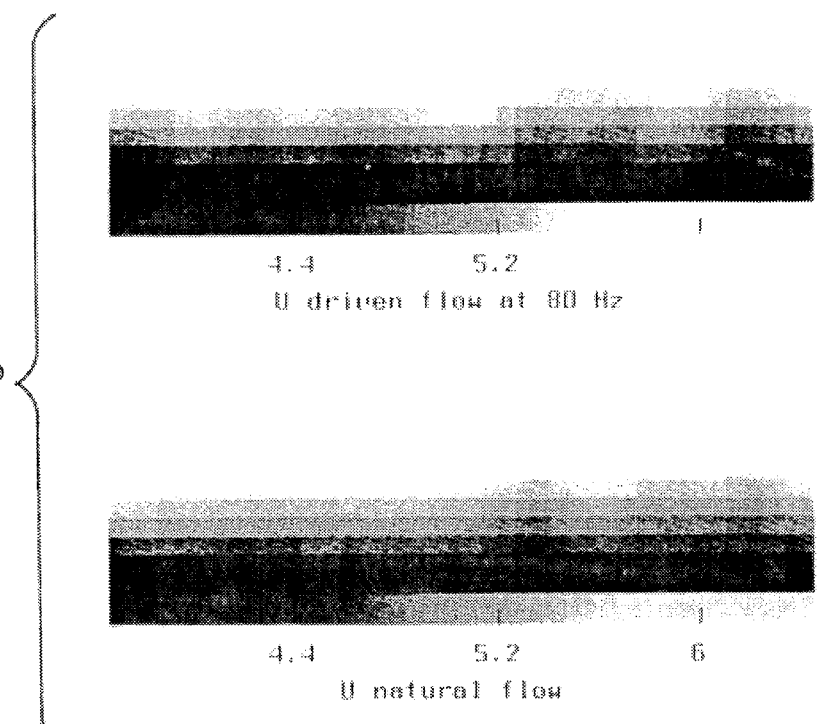

FIG. 15a3
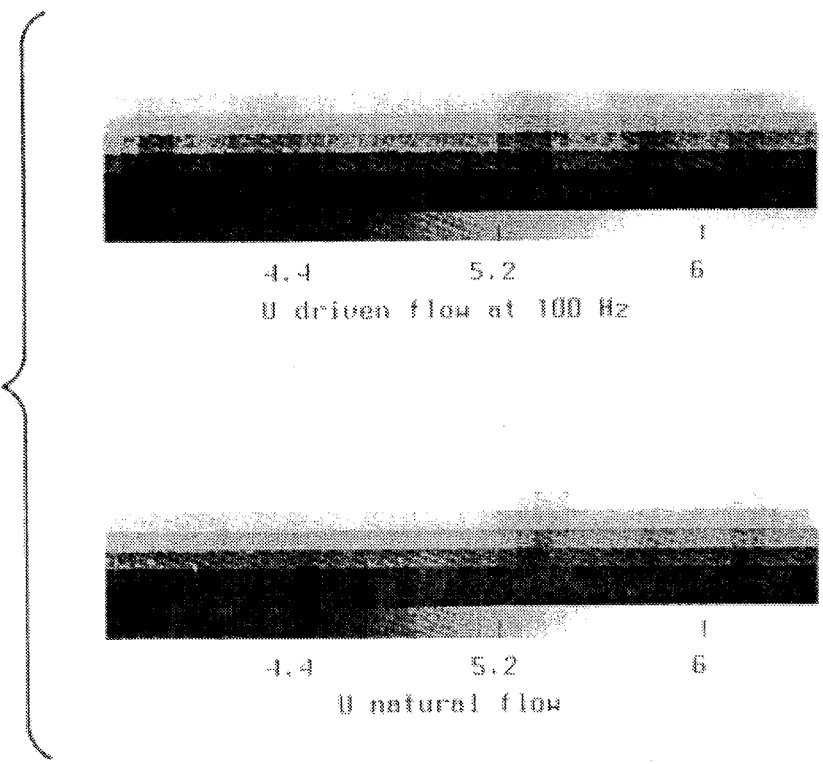
FIG. 15a4
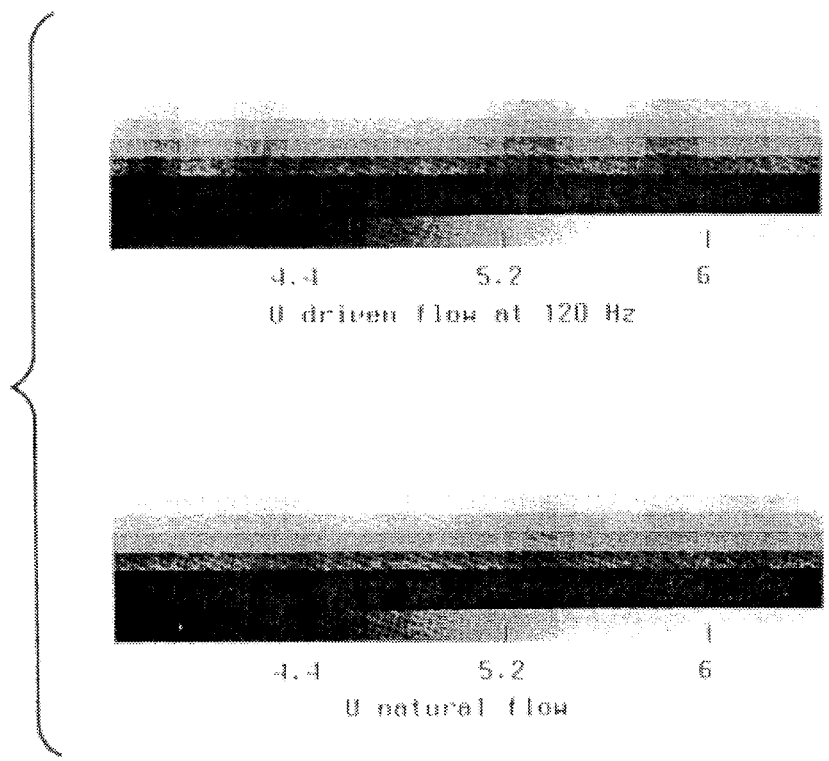

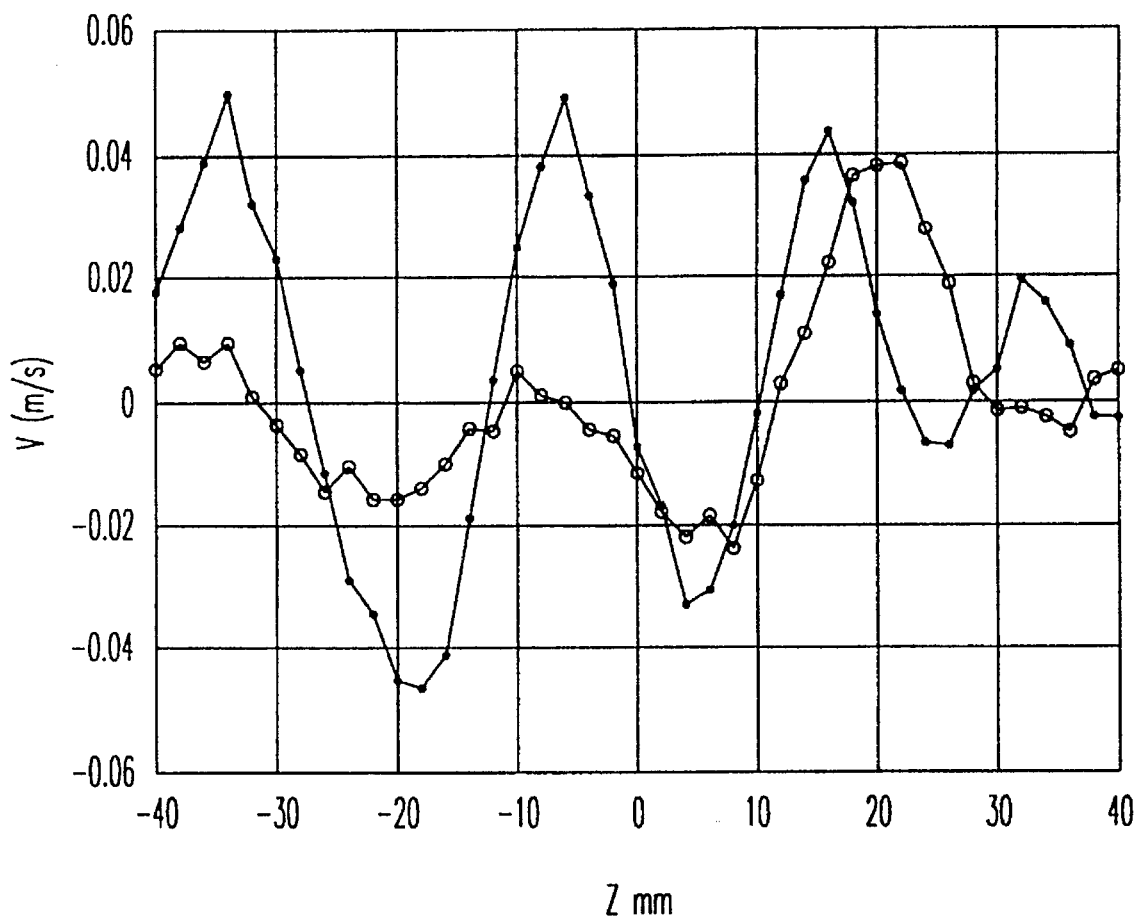
FIG. 15(b) VERTICAL VELOCITY TRACE

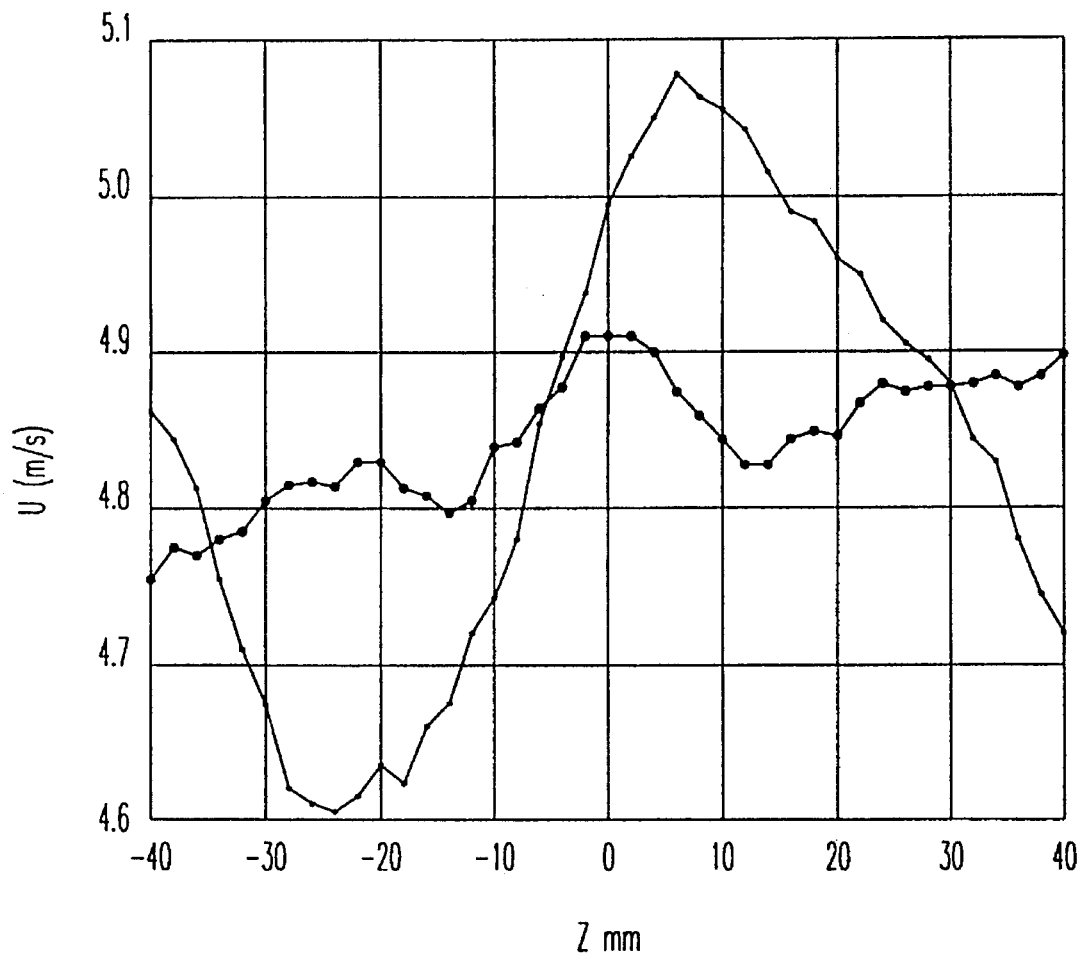
FIG. 15(c) HORIZONTAL VELOCITY TRACE

E.G., a=3 cm ~ 500 WALL UNITS

METHOD OF AND APPARATUS FOR CONTROLLING TURBULENCE IN BOUNDARY LAYER AND OTHER WALL-BOUNDED FLUID FLOW FIELDS

This application is a continuation of application Ser. No. 08/447,170, filed May 19, 1995, now abandoned, which is a continuation of application Ser. No. 08/253,134, filed Jun. 2, 1994, now abandoned.

TECHNICAL FIELD

This invention relates to a method of and apparatus for controlling turbulence in boundary layer and other wall-bounded fluid flow fields.

RELEVANT PUBLICATIONS (1) "Plane Waves and Structures in Turbulent Channel Flow" by L. Sirovich, K. S. Ball, and L. R. Keefe, *Phys. Fluids* A2(12), December 1990, p2217–2226.

(2) "Propagating Structures in Wall-Bounded Turbulent Flow", L. Sirovich, K. S. Ball and R. A. Handler, *Theoret. Comput. Fluid Dynamics* (1991), 2:307–317.

BACKGROUND ART

From the viewpoint of classical fluid mechanics, turbulence is perceived as a chaotic condition with the excitation of all possible degrees of freedom. This perception is supported from direct observation of large scale activities, such as weather patterns in the atmosphere and water flowing in a pipe, to mundane experiences like stirring cream into coffee, or mixing paint.

Turbulence can be harmful or helpful: it produces undesired drag on a car or an airplane; but it effects mixing fuel with air in an engine, or rapidly distributing heat in a room. Turbulence has had an enormous impact on human experience, but its perception as a chaotic condition has resisted scientific analysis until recent years. With the advent of super computers which permit the numerical investigation of wall-bounded turbulent flow, and the performance of modern experiments, there has been a dramatic shift in the perception of turbulence. Where it was once viewed as being a chaotic condition, turbulence is now viewed as having coherent patterns of activity in the midst of apparent chaos.

Careful scrutiny of a wall or boundary of streaming turbulent flow, as for example, in the case of air flow over an airplane wing, or liquid flow inside a pipeline, has shown the presence of coherent structures in the form of pairs of counter-rotating streamwise rolls adjacent the walls, but located at the outer edge and beyond the sublayer. These rolls, which are sometimes referred to as streaks, show considerable meander and variation in their dynamic activity. Of great importance is their sudden contortion or kinking, resulting in a sudden bursting forth of slow moving fluid from near the wall into the fast moving main body of fluid motion. This bursting results in a net drag on the walls. It has been estimated that these bursts, which account for 80% of the drag on a wall, occur only roughly 20% of the time. Again, a study of the patterns of such flow shows that the contortion of the rolls undergoes a stereotypical coherence pattern through temporal change that is typical of all wall-bounded turbulence.

To specify the width of the streaks, it is first necessary to recognize that the streaks are a manifestation of local conditions beyond the sublayer of the flow adjacent to a wall, and not the nature of the wall, nor the flow field significantly spaced from the wall. Local conditions are fully specified by the average frictional stress at a wall, s, the density of the fluid, r, and the viscosity of the fluid, m. These quantities define a local size dimension, or length scale $l_*$ which is usually referred to as a wall unit and is equal to $m/(sr)^{1/2}$. The dominant roll diameter is nominally 50 to 100 wall units, or 100 $l_*$ to 200 $l_*$ per pair.

The term "dominant", in referring to the roll diameter, means that the greatest amount of turbulent energy (of the fluctuating velocity) resides in modes of activity of this size. There is, in addition, other modes of the same roll type, having a range of sizes and which also contain significant amounts of turbulent energy. In summary, the major contribution to drag on a wall arises because of the disruption of the orderliness of these roll type modes, to their contortion, and finally to the relatively violent bursting events that mixes slow moving fluid into more rapidly moving fluid.

This picture of the events in wall-bounded turbulence was significantly enhanced with the discovery that propagating structures are also present in the turbulent wall region. In reference (1) cited above, it is shown that propagating structures are coherent patterns which propagate at a constant group speed. In reference (2) cited above, the existence of propagating modes was further confirmed. As an aside, a literature search produced a paper written 20 years ago in which experiments on wall turbulence hinted at, but did not directly suggest, the presence and function served by such propagating modes in turbulent flow.

As it is argued in the above cited publications, the propagating modes act as triggers for the bursting events that give rise to the drag producing events found in turbulent wall-bounded flows. Although the propagating modes carry relatively little energy themselves, bursting events do not occur unless the propagating modes are present. In addition, the experimentally and numerically measured time courses of the bursting events corresponds to that of the propagating modes. The most energetic, and therefore the most important of the propagating modes, are those that propagate at an angle of about 65° from the streamwise direction; and those in the range 50°–80° have the dominant energy content of the propagating modes.

The wavelengths of the triggering modes are also an important factor. Those waves with wavelengths comparable to the roll size play a significant role in the bursting events.

The most significant triggering modes have a lateral extent which is comparable to the wavelength of the energy bearing roll modes. This strongly implies the existence of a resonance mechanism which, through the triggering operation, facilitates ejection of the roll modes. For reference purposes, the main triggering modes are sometimes referred as the long wavelengths modes. There are no significant longer wavelength modes present, but many shorter wavelength modes are present.

It is therefore an object of the present invention to provide a method of and apparatus for modifying and managing turbulent flow through a modification of the trigger modes.

BRIEF DESCRIPTION OF THE INVENTION

According to the present invention, a method of controlling turbulence in boundary layer or other wall-bounded fluid flow fields is provided, the flow field having a turbulent wall region characterized by a system of roll pairs, which exhibit steaks, whose diameter is functionally related to the strength of the flow, and which extend in the direction of flow, and by propagating structures of coherent patterns that propagate obliquely to the direction of flow at a substantially constant group speed. The method includes locally introducing into the turbulent wall region a disturbance field whose amplitude, wavelength and direction of propagation are such that the disturbance is strongly coupled to and modifies the propagating structures in a manner that increases or decreases the interaction of the propagating structures with the system of roll pairs for locally increasing or decreasing the turbulence or turbulent drag in the flow field.

When the turbulent drag is to be decreased, the method comprises providing one or optionally two means which operate simultaneously producing a disturbance that results in generating a pair of oblique waves for enhancing the roll pairs such that the roll pairs are organized. According to the present invention, one of the means may include a linear strip of "delta" shaped protrusions positioned spanwise on the wall (i.e., transverse to the flow direction) which produce a disturbance in the flow field that interacts with another disturbance caused by a second means which may be in the form of one or more sound generators that inject energy into the disturbance caused by the protrusions. Alternatively, an array of linear strips of "delta" shaped protrusions positioned spanwise on the wall may be used instead of a single linear strip. The disturbance produced by the protrusions and by the sound generators, interact with each other and produce obliquely propagating structures that enhance the roll pairs and reduce turbulence.

In a further alternative, the interacting disturbances may be caused by a strip, or an array of strips, of "delta" shaped heating elements spanwise embedded in the wall, and the time-dependent operation of the heating elements produce a combined disturbance in the flow field in the form of obliquely directed waves of heated fluid that enhances the roll pairs and reduces turbulence.

In addition, the present invention comprises means for controlling turbulence in boundary layer or other wall-bounded fluid flow fields described above, including means for locally introducing into the turbulent wall region a disturbance field whose amplitude, wavelength and direction of propagation are such that the disturbance is strongly coupled to and modifies the propagating structures in a manner that increases or decreases the interaction of the propagating structures with the system of roll pairs thereby locally increasing or decreasing the turbulence or turbulent drag in the flow field. The means for decreasing the turbulent drag can include those described above.

BRIEF DESCRIPTION OF DRAWINGS

Embodiments of the present invention are described by way of example with reference to the accompanying drawings wherein:

FIG. 5 is a cross-section of a wall-bounded fluid flow field taken in a direction perpendicular to the direction of fluid flow showing a plurality of transducer elements, such as heaters, ultrasound generators, etc. embedded in the wall surface;

FIG. 6 is a nominal time diagram showing the manner in which the various transducers are timewise activated;

FIG. 7 is a plan view of the fluid flow field shown in FIG. 5 showing a nominal distribution of disturbances introduced into the fluid flow by reason of the timewise activation of the transducers in accordance with the diagram shown in FIG. 6;

FIG. 13a is a plan view of a test section similar to that shown in FIG. 12a but showing sonic generators attached to opposite sides of the test section;

FIG. 13b is a side view of the test section of FIG. 13a showing the slit by which a sonic disturbance is introduced into turbulent flow in the test section;

FIG. 14 shows dimensional details of a linear strip of "delta" shaped protrusions used in connection with FIGS. 10a, 10b, 11a, 11b, 12a, 12b, 13a, and 13b;

FIGS. 15a1–15a4 are computer-generated plots from experiments showing spanwise variations of the streamwise velocity in the vicinity of a wall obtained using test sections like that shown in FIGS. 10a and 11a;

FIG. 15b is graph comparing root mean square vertical velocity verses span-location for natural flow disturbed by the presence of a strip of delta-shaped protrusions and into which an 86 Hz. sound wave is injected in the environment shown in FIG. 10a;

FIG. 15c is graph that compares mean streamwise velocity verses span-location for natural flow disturbed by the presence of a strip of delta-shaped protrusions and into which an 52 Hz. sound wave is injected in the environment shown in FIG. 10a;

12a and showing an array of protrusions in the form of counter-lifting airfoils, each producing counter-rotating roll systems.

Figure 18:
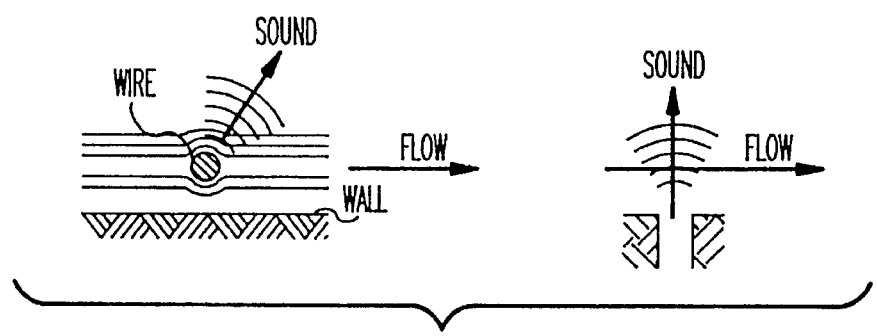
Figure 19:
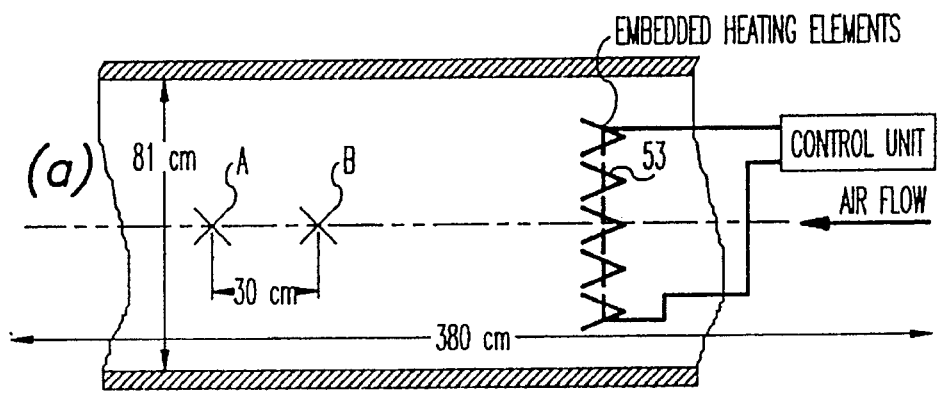
Figure 19:
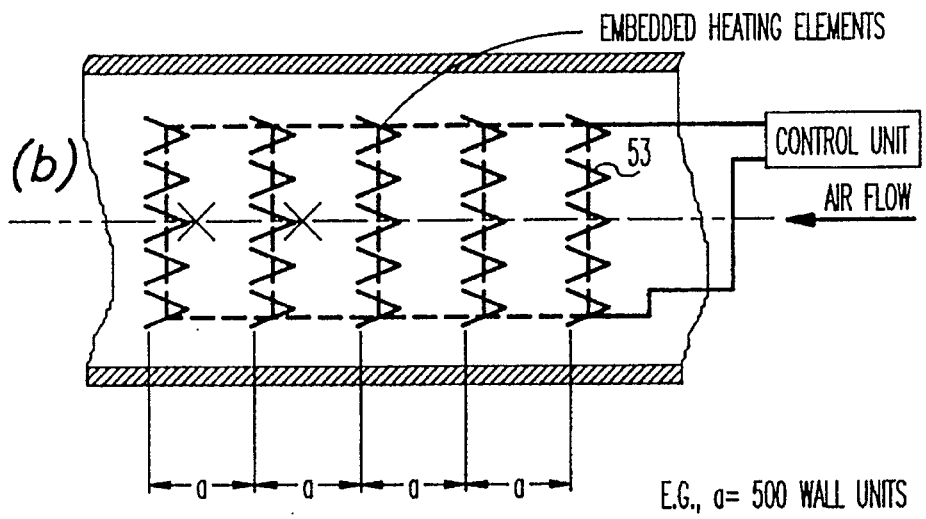

FIG. 17a is a plan view of a test section of a wind tunnel including a linear strip of "delta" shaped protrusions positioned spanwise on the wall (i.e. transverse to the flow direction);

FIG. 17b is a plan view of a test section of a wind tunnel including a plurality, or an array, of linear strips of "delta" shaped protrusions positioned spanwise on the wall (i.e., transverse to the flow direction);

FIG. 18 is a schematic diagram of examples of "natural" sound generators for use in accordance with the present invention;

FIG. 19a is a plan view of a test section of a wind tunnel including a linear strip of embedded "delta" shaped heating elements positioned spanwise on the wall (i.e., transverse to the flow direction); and FIG. 19b is a plan view of a test section of a wind tunnel including a plurality or array of linear strips of embedded "delta" shaped heating elements positioned spanwise on the wall (i.e., transverse to the flow direction).

DETAILED DESCRIPTION

Recent and as yet unpublished research has focused on modifying and managing turbulent flow by modification of the triggering modes. In a series of computer stimulations, turbulent flow driven down a channel with fixed walls has been considered. During the course of the simulations, distortion was applied to selectively chosen triggering modes. The randomization of the phases of the motion was chosen as the means of distortion. In effect, this suppressed long wave motions. There is nothing special about the method of phase randomization; and other distortion methods would work as well. It was found that by randomizing the phases of just the long wavelength propagating modes, the flow rate was increased by more than 30%. Associated with this effect is an indication that drag reductions of more than 40% can be achieved. The randomization of modes other than the long wavelength modes produced little or no effect. On the other hand, enhancement of the amplitudes of the long wavelength propagating modes substantially increases turbulent mixing. This provides strong substantiation that the interaction of the wave and roll modes are fundamental to the bursting mechanism.

Referring now to the drawings, reference numeral 10 designates a wall-bounded turbulent flow field including wall 12 restraining fluid 13 containing local structures in the form of counter-rotating rolls 14, 16 of fluid. The axes of these rolls, or streaks as they are sometimes called, lie in the direction of fluid flow which is into the paper showing FIG. 1, and as indicated by arrow 17 in FIG. 2. Details of the nature of these rolls are contained in reference (1), FIG. 10, page 2223. Briefly, these counter rotating rolls have diameters that are a function of the strength of the flow, and a length much greater than their diameters (in excess of 1000 $l_*$). As indicated above, the dominant roll size is roughly 100 $l_*$ to 200 $l_*$ per pair.

In fully developed turbulent flow, these local roll structures travel downstream through-out the near wall region, are disrupted, contort, and finally burst. It is the interaction between the coherent structure of propagating modes present in the flow with the coherent structure of the rolls that result in the bursting of the rolls, and the consequent mixing of slow moving fluid near the boundary with rapidly moving fluid in the main flow and vice versa.

The present invention provides both passive and active mechanisms for controlling the triggering aspects of the wave propagating modes which cause bursting of the roll-modes in turbulent wall-bounded flows. A passive mechanism, according to the present invention, for controlling the wave propagation modes is the presence of shape modifications, such as grooves, undulations, etc. on the walls containing the turbulent flow. For example, the shape modifications can be achieved by actually grooving the walls, or by applying to the walls an adhesive layer which contains the required shapes. When the shape modification is in the form of undulations, their amplitude should be in the range 15–20 wall units in order to include the location of peak turbulence production. The wavelength or pitch of typical undulations will depend on the objective of the turbulence management. The orientation of the undulations, i.e., the direction of the troughs between the peaks of the undulations, should be inclined at about 15°–30° off the streamwise direction. That is to say, the "propagation" direction of the undulations should be about 60°–75° from the streamwise direction.

Figure 2:
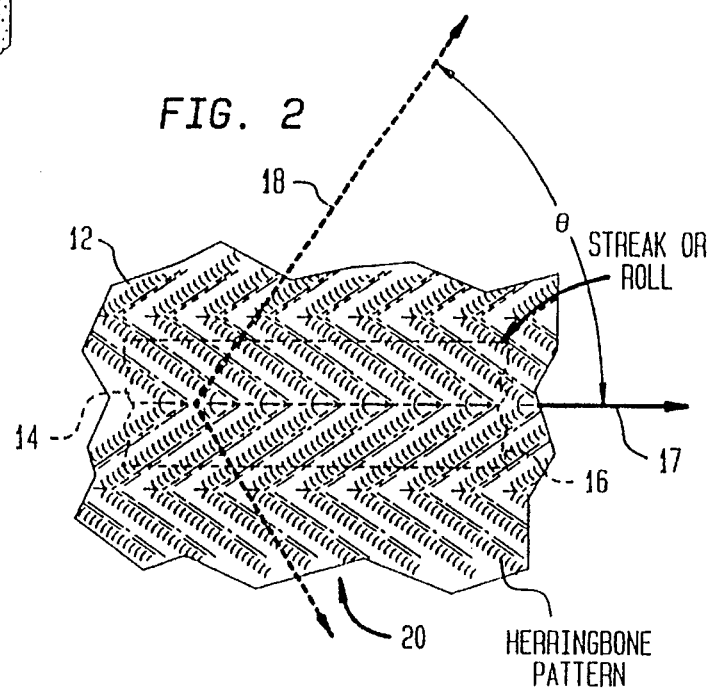
FIG. 2 is a schematic plan view of the fluid flow field shown in FIG. 1 showing streaks or rolls adjacent a wall boundary having herring-bone undulations.

FIG. 2 shows a plan view of rolls 14, 16; and superimposed on these rolls are waves that propagate (the propagating modes) whose direction is indicated by arrow 18 making an angle $\pm\Theta$ with the flow direction 17. As indicated above, $\Theta$ lies in the range 50°–80° for the waves having the dominant energy content. To account for the possible bidirectional angle of the propagating modes, the undulations are preferably in the form of herring-bone pattern 20 as shown in FIG. 2, or a complete cross-hatched or "knurled" pattern.

Figure 3:
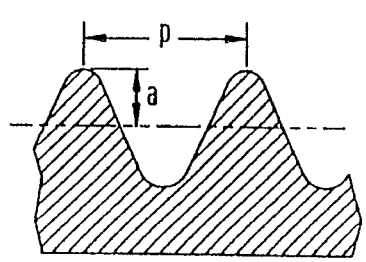
FIG. 3 is a cross-section through the wall showing the undulations.

In order to enhance mixing and, for example, increase heat transport, (i.e., increase turbulence), and therefore to encourage the eruption of bursts, the undulations should be ordered in a strictly sinusoidal pattern as indicated in FIG. 3. The wavelength p is preferably in the range 100–300 wall units in order to achieve resonance with the triggering modes, and the amplitude a is preferably in the range 15–20 wall units.

In order to reduce drag, the undulations should be given a pattern that introduces phase interference in the waves in a manner that is analogous to the above-mentioned phase randomization. One method for achieving this is by creating a "chaotic" pattern modulation by the resonant wavelength, and containing a suitable sum of incommensurate sinusoids ranging down in wavelength. A model cross-sectional plot is given in FIG. 4.

In addition to the use of passive mechanisms for interacting with the wave propagation modes to control turbulence, the present invention also contemplates the use of active devices for this purpose. Embodiment 30, shown in FIG. 5, is an example of an active device. As shown, flush mounted wall transducers in the form of heating elements 31, 32, etc. are activated by transducer control 33 in the form of a heater control. The operation of heater control 33 is to pulse the heaters in time-sequence to effect local heating of the fluid in the same patterns as those generated by the undulations in the wall surface of the bounded flow. Thus, the localized heating will create wave patterns of varying densities which either inhibit or enhance the bursting activity.

Control modes 33 may activate the heaters in sequence as shown in FIG. 6 providing a spatial distribution of disturbances as indicated in FIG. 7. Wave modes, or patterns, which introduce phase interference in the wave modes can be established by the thermal patterns in a fashion analogies to that of the undulations described above.

Both of the above described mechanisms effect control over the triggering mechanisms, and are suitable for steady-state flow conditions. In both instances, the placement of the patterns is fixed, whether by surface modification or by appropriate positioning and pulsing of heat elements. The fixed pattern is prescribed by condition of the flow as specified by its parameters (e.g., the Reynolds number).

Other applications effect control over turbulence under variable flow conditions. Wall-mounted heating elements can be mounted in bands perpendicular to the flow direction. These elements can be triggered subsequently in time in order to create an oblique wave of any angle. By suitably triggering, or pulsing a grid of heating elements, any pattern of activity can be established to either enhance or diminish the bursting phenomenon. This will allow the application of these considerations to cases where there is a variable flow rate (i.e., a variable Reynolds number).

Phase randomization, on the one hand, and phase enhancement on the other, of the disturbances introduced into the fluid flow, can also be achieved by means of sound wave generation either with wall-mounted acoustic generators, or with externally mounted sound generators positioned as indicated by the transducers in FIG. 5. Phase enhancement of the triggering modes leads to increase mixing of the fluid flow may be established through the standing wave patterns. Asynchronous sound generation resulting in patterns described above in connection with the undulated surface, can be created by suitably driving arrays of acoustic generators. Variable flow rates can be treated by suitable programming of the acoustic drivers.

The same effect of phase randomization, or enhancement of triggering modes, can be achieved by wall mounted vibration transducers producing vibrations of the wall in an appropriate pattern, with consequent transmission of the vibrations into the flow. The sound or acoustic generators, or vibration transducers may be mounted as arrays at the side walls of a duct, or on the circumference of a pipe, or on the wall(s) of other wall bounded flow.

The present invention can also be carried out in a wall-bounded fluid flow system wherein the fluid is electrically conductive as, for example, sea water. In such case, the disturbance can be introduced by a varying magnetic, or electro-magnetic field associated with, or adjacent to the wall(s) in order to introduce the desired disturbance, or to effect changes, in the the propagating structures or modes in the manner previously described.

The present invention is particularly applicable to ducts, curved ducts, pipes, curved pipes, compressors, pumps, and turbines so as to reduce turbulence. The invention is also applicable to combustion chambers in internal combustion engines, and the like such that mixing in the chambers is enhanced to promote combustion.

If the turbulent fluid is electrically conducting, or weakly conducting, as in the case of sea water, electrical means are available for establishing the wave patterns discussed thus far. Wall-mounted electrodes positioned as shown by the transducers in FIG. 5 can be used to set up currents which can be used for local heating, or coupled to magnetic fields, to establish local forces. These can be used to manage the appropriate wave patterns discussed above. Finally, wall-mounted strain gauges, pressure gauges, thermocouples, or any other fine scale measuring devices, can be used to detect the onset of the triggering propagating waves. These signals can be used in a feedback loop with either thermal, acoustic, or electrical scheme either to selectably enhance or to destroy the evolving triggering propagating modes.

While the present invention is disclosed herein in relation to turbulent flow in wall-bounded fluid flow fields, the above described methods and apparatus of the present invention can be used in turbulent boundary flows such as occur adjacent bodies moving in a fluid. Thus, the invention is applicable to bodies moving in air (e.g., wheeled vehicles on the ground, and aircraft), and bodies moving in water (e.g., ships), etc.

In addition, the above described methods and apparatus, the present invention also can be carried out in a boundary layer flow system wherein the fluid is electrically conductive as, for example, sea water. In such case, the disturbance can be introduced by a varying magnetic, or electro-magnetic field associated with, or adjacent to a body such as a vessel being operated in sea water in order to introduce the desired disturbance, or to effect changes, in the the propagating structures or modes in the manner previously described.

Figure 8:
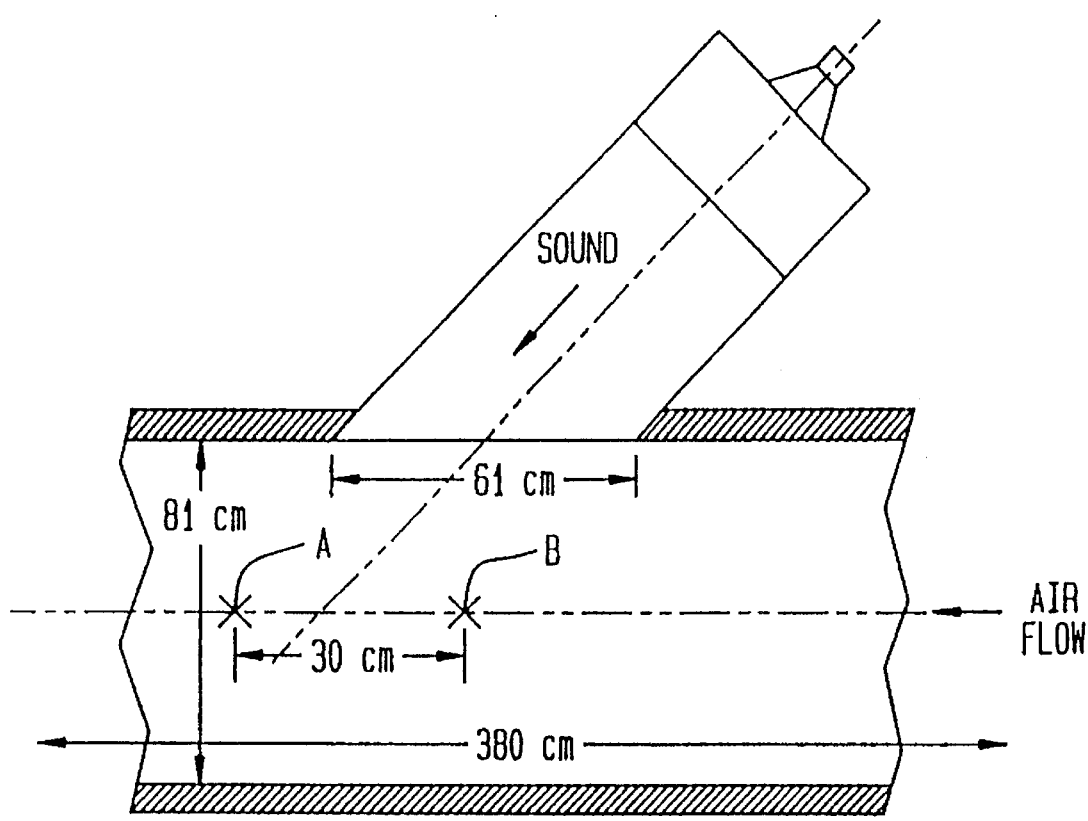
FIG. 8 is a plan view of a test section of a wind tunnel showing a sonic generator attached to one side of the test section.
Figure 9:
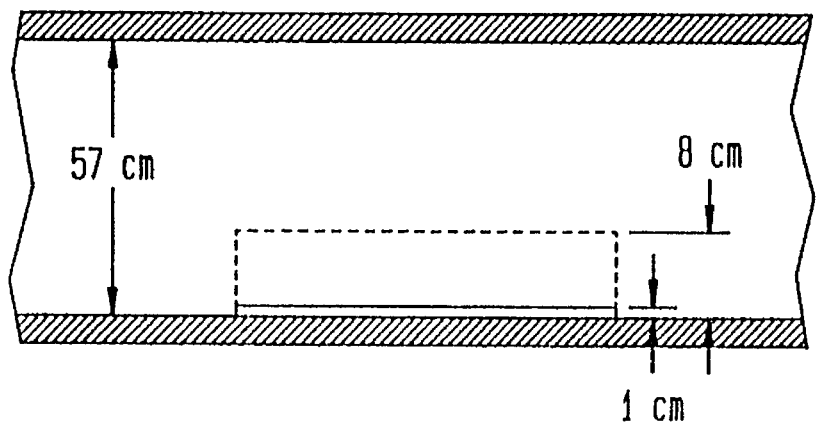
FIG. 9 is a side view of the test section showing the slit by which a sonic disturbance is introduced into turbulent flow in the test section.

In an actual physical experiment, a substantial reduction (9%) in turbulent drag was observed when a relatively weak sound generator was used to introduce a a sonic disturbance within the test section of a wind tunnel. FIG. 8 shows the relationship between a sonic resonator used in the experiment and the test section. As indicated, the test section of the wind tunnel was about 57 cm. high×81 cm wide, and had a length of about 380 cm. A sound generator was attached to the side of the test section at an angle of about 65°. The sound generator was in the form of a resonator box having a tapered section about 22 cm. long and measuring about 61×22 cm. at an end to which a loud speaker was attached and about 8×61 cm. opposite the speaker. Attached to the tapered section was linear section having a length of about 42 cm. on one side and a length of about 72 cm. on the opposite side. The free end of the linear section was blocked off to produce a slit 1 cm. high×61 cm. long. The slit was positioned in alignment with a wall of the test section.

Measurements were made using a straight hot wire at two points 30 cm. apart near a wall of the test section. One of the points coincided with the axis of the resonator box and was located about 190 cm. into the test section.

At the axis point, the turbulent boundary layer thickness was 48 mm. for flow with a Reynolds number of $7.7 \times 10^5$ based on the free stream velocity. A drag reduction of about 9% was obtained with the loud speaker driven by an amplifier that produced an audio signal whose driving frequency was about 170 Hz. with its phase randomized in the range 0°–360° at 426 Hz. in accordance with a study reported in "Drag Reduction in Turbulent Channel Flow by Phase Randomization" by A. R. Handler, E. Levich, and L. Sirovich, *Phys. Fluids,* the disclosure of which is hereby incorporated by reference. The frequencies, or the wavelengths, used in the acoustic disturbance introduced into the test section was in accordance with those specified in the present invention, namely in the range 100–300 $l_*$ (where $l_*$ is a wall unit).

Further, various mechanical means also may be provided for introducing the desired disturbance into the fluid. For example, an array of extensions such as small wires extending into the fluid flow may be excited under the combined action of the flow, and the elasticity of the wires in resisting the flow, to provide the desired disturbance.

Figure 10A:
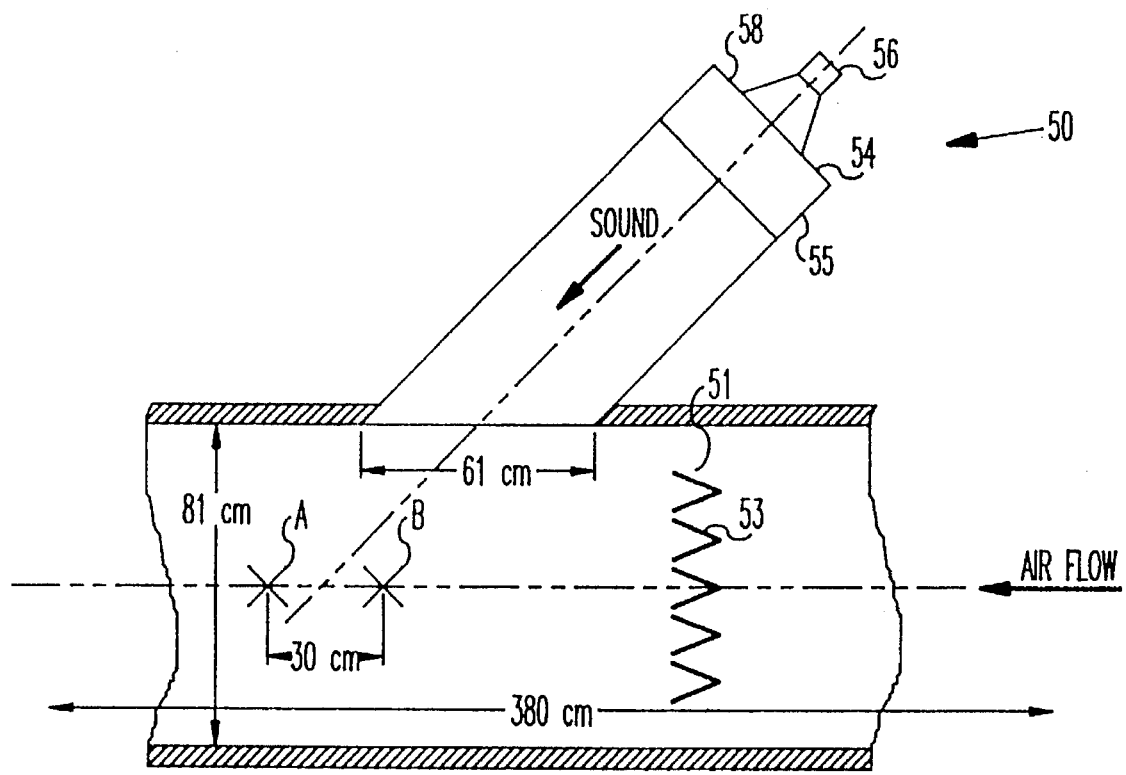
FIG. 10a is a plan view of a test section similar to that shown in FIG. 8 but including a linear strip of "delta" shaped protrusions positioned spanwise on the wall (i.e., tranverse to the flow direction)
Figure 10B:
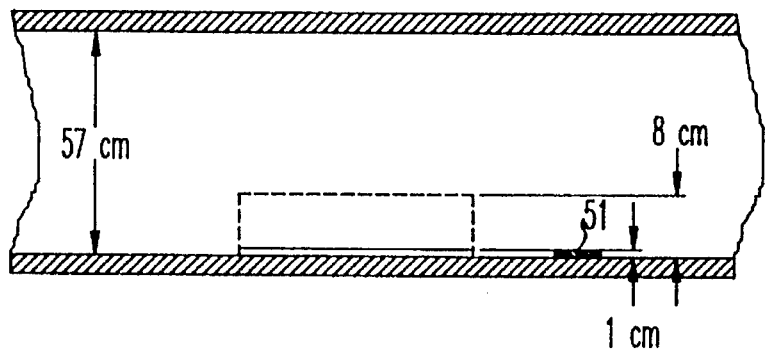
FIG. 10b is a side view of the test section of FIG. 10a showing the slit by which a sonic disturbance is introduced into turbulent flow in the test section.

Turning to FIGS. 10a and 10b, an embodiment of the present invention is described with reference to these figures wherein two means which operate simultaneously are provided for producing two separate disturbances that are effective, in a local region, to form a composite disturbance field that is strongly coupled to and modifies the obliquely propagating structures in a manner that increases or decreases the interaction of the propagating structures with the system of roll pairs thereby locally increasing or decreasing turbulent drag in the flow field. In this embodiment, apparatus 50 includes first means 51 in the form of strip 52 of delta-shaped protrusions 53, and second means 54 comprising sound generator 55 in the form of a resonator box to which loud speaker 56 is attached at its free end 58. The result of this arrangement is that a disturbance is produced which generates a pair of oblique waves for enhancing the rolls such that the rolls are organized for decreasing the turbulent drag.

For the above described embodiments using delta-shaped protrusions, each delta-shaped protrusion has a nominal base perpendicular to the direction of mean flow in the present instance of about 4 mm., a nominal length in the direction of flow of about 5 mm., and a spanwise pitch of about 5 mm, roughly about 120 wall units. Length dimensions of about 100, 200, and 400 wall units, respectively, also are presently being investigated. When an array of strips of delta-shaped protrusions is employed, the streamwise spacing between adjacent strips is about 2 cm. which is about 600 wall units for these embodiments. For other flow conditions, the sizes would vary accordingly.

Figure 11A:
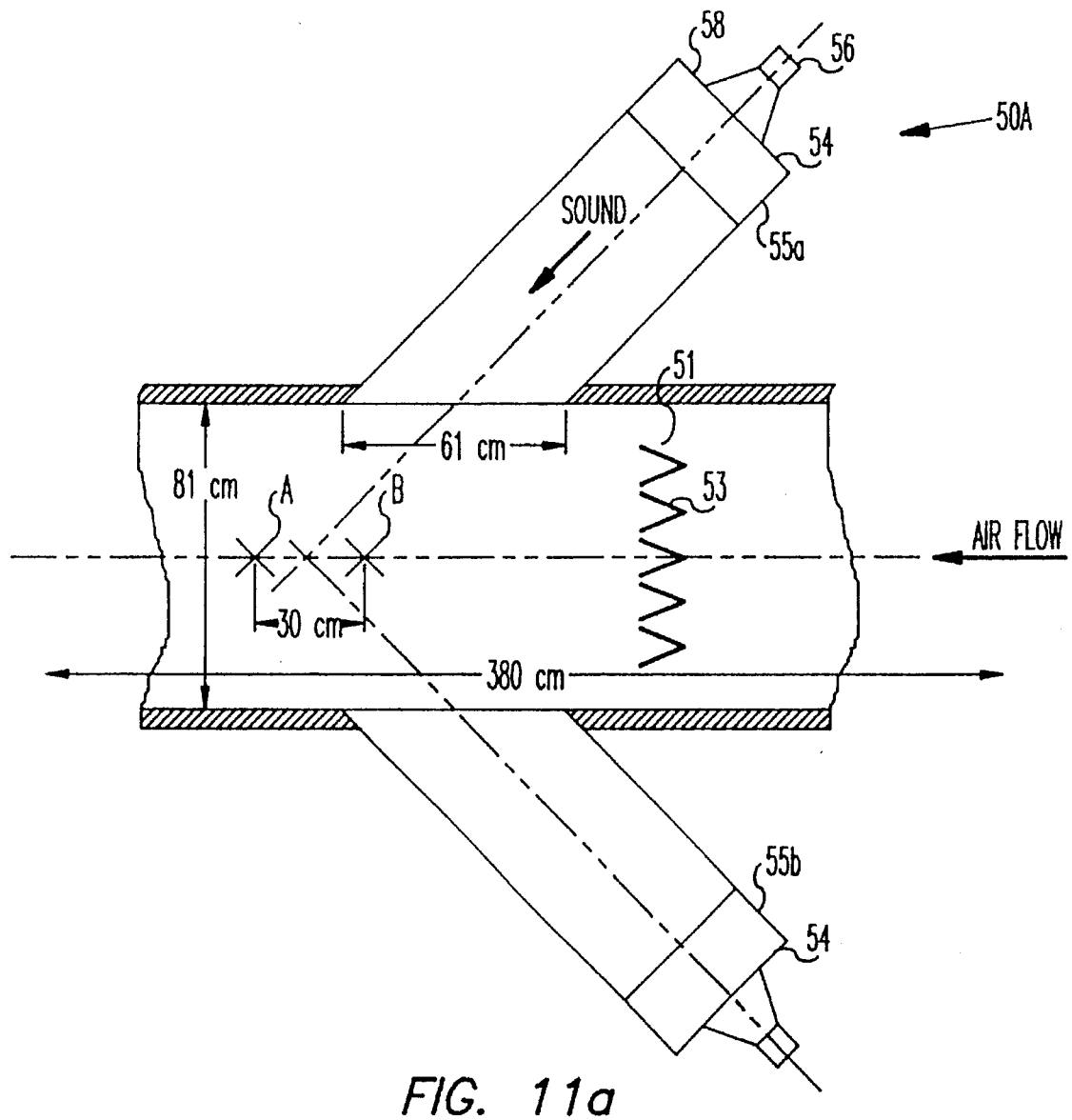
FIG. 11a is a plan view of a test section similar to that shown in FIG. 10a but showing sonic generators attached to opposite sides of the test section.
Figure 11B:
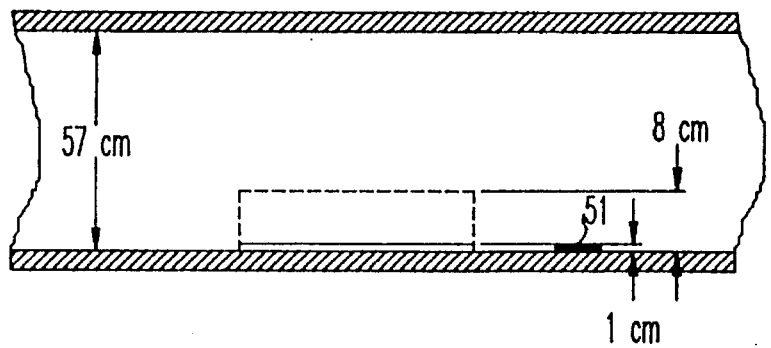
FIG. 11b is a side view of the test section of FIG. 11a showing the slit by which a sonic disturbance is introduced into turbulent flow in the test section.

Turning to FIGS. 11a and 11b, a further embodiment of the present invention is described with reference to these figures wherein two means which operate simultaneously are provided for producing a disturbance that decreases the turbulent drag in the flow field. In this embodiment apparatus 50 includes first means 51 in the form of strip 52 of delta-shaped protrusions 53, and second means 54 comprising sound generators 55a and 55b. These sound generators produce a disturbance that interacts with the disturbance caused by the protrusions for generating a pair of oblique waves for enhancing the rolls such that the rolls are organized for decreasing the turbulent drag. Here, for convenience, sound generator 55a is described in detail but actually sound generator 55b is identical. Sound generator 55a comprises a resonator box to which load speaker 56 is attached at its end 58. Both of these means operate for producing a disturbance that generates a pair of oblique waves for enhancing the rolls such that the rolls are organized for decreasing the turbulent drag.

Figure 12A:
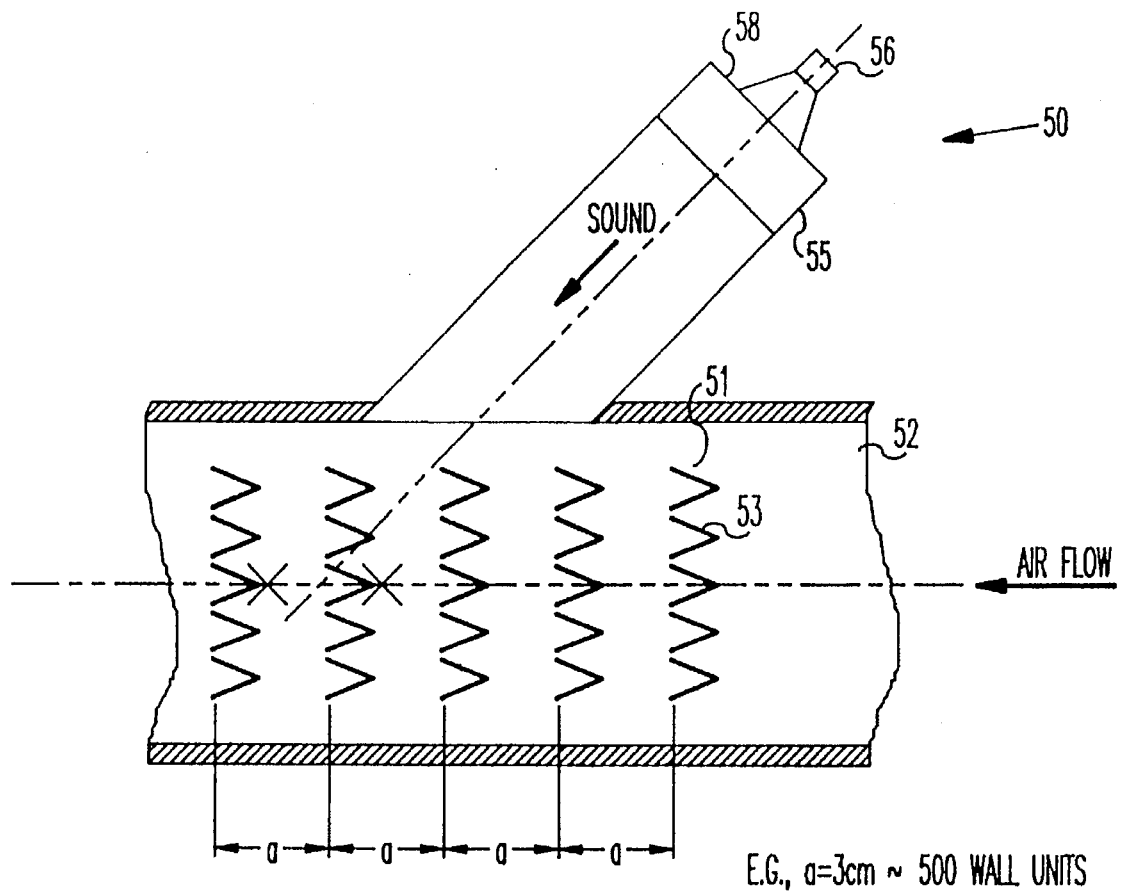
FIG. 12a is a plan view of a test section similar to that shown in FIG. 10a but including a plurality of linear strips of "delta" shaped protrusions positioned spanwise on the wall (i.e., transverse to the flow direction)
Figure 12B:
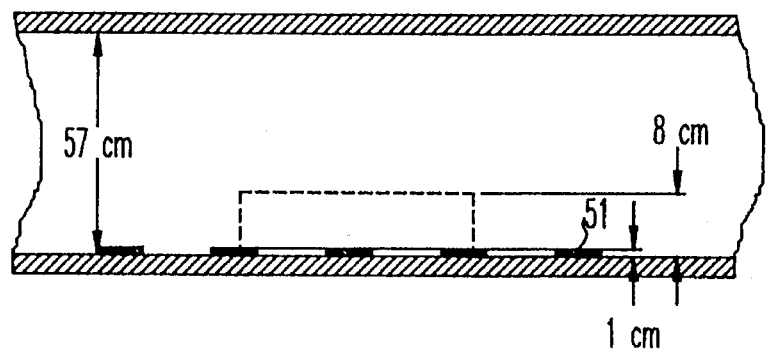
FIG. 12b is a side view of the test section of FIG. 12a showing the slit by which a sonic disturbance is introduced into turbulent flow in the test section.

A further embodiment of the present invention is described with reference to FIGS. 12a and 12b, wherein two means which operate simultaneously are once again provided for producing a disturbance which decreases the turbulent drag in the flow field. In this embodiment, apparatus 50 includes first means 51 in the form of an array of strips 52 of delta-shaped protrusions 53, each strip being transverse to the direction of flow, and the array being located in the sonic path of sound generator 55 which forms second means 54 of the apparatus.

Sound generator 55, in the present instance, is in the form of a resonator box to which loud speaker 56 is attached at its free end 58 for producing a disturbance which generates a pair of oblique waves for enhancing the rolls such that the rolls are organized for decreasing the turbulent drag.

A still further embodiment of the present invention is described with reference to FIGS. 13a and 13b, wherein two means are once again provided for producing at disturbance which decreases the turbulent drag in the flow field. In this embodiment apparatus 50 includes first means 51 in the form of an array of strips 52 of delta-shaped protrusions 53. Second means 54 of this embodiment comprises sound generators 55a and 55b for producing a disturbance which generates a pair of oblique waves for enhancing the rolls such that the rolls are organized for decreasing the turbulent drag. Here, for convenience, sound generator 55a is described in detail but actually sound generator 55b is identical. Sound generator 55a comprises a resonator box to which load speaker 56 is attached at its end 58. Both of these means operate for producing at disturbance which generates a pair of oblique waves through interaction with the delta strip arrays for enhancing the rolls such that the rolls are organized for decreasing the turbulent drag.

In the embodiments described with relation to FIGS. 10a and 10b, FIGS. 11a and 11b, FIGS. 12a and 12b; and FIGS. 13a and 13b, the strips of delta-shaped protrusions are laid down on the wall of a wind tunnel where a turbulent boundary layer is produced when the wind tunnel is operated. At present, the preferred dimensions are as shown in FIG. 14, with the height of each delta being preferably in the range of 12 to 15 wall units, which, under the conditions of the present embodiments, is roughly 0.5 mm.

In these embodiments, sound waves emitted from one or both side walls of the tunnel interact with the elevated delta-shaped protrusions and produce waves that are oblique to the direction of flow wave fronts which is parallel to the crests of the delta-shaped protrusions. A non-linear interaction ensues between the waves at the two oblique angles and the roll mode. Such interaction results in enhanced roll structures of the type shown in FIGS. 15a, 15b and 15c.

It has been found thus far that the most effective enhanced roll structures produced are those where the driving frequency of the sound generators is in the range of 60 to 90 Hz under the experimental conditions. Use of arrays of strips of delta-shape protrusions as described in relation to FIGS. 12a, 12b, 13a and 13b enables the roll structure produced to be enhanced and preserved rather than being rather short lived, were only a single strip of delta-shaped protrusions used as described in relation to FIGS. 10a, 10b, 11a and 11b. In the case of using the arrays, the strips of delta-shaped protrusions are placed in phase locked arrangements, e.g., nominally at a distance of approximately 500 wall units between each strip of the array as shown in FIGS. 12a and 13a.

In these arrangements, the combined action of the sound waves generated modes and strip or strips of delta-shaped protrusions, generated modes produces a disturbance having a wavelength determined by the characteristic scales of the first means and a frequency of the acoustic waves produced by the second means. The result of the application of the disturbance to the turbulent boundary layer is relatively well established and robust roll patterns appear.

Figure 1:
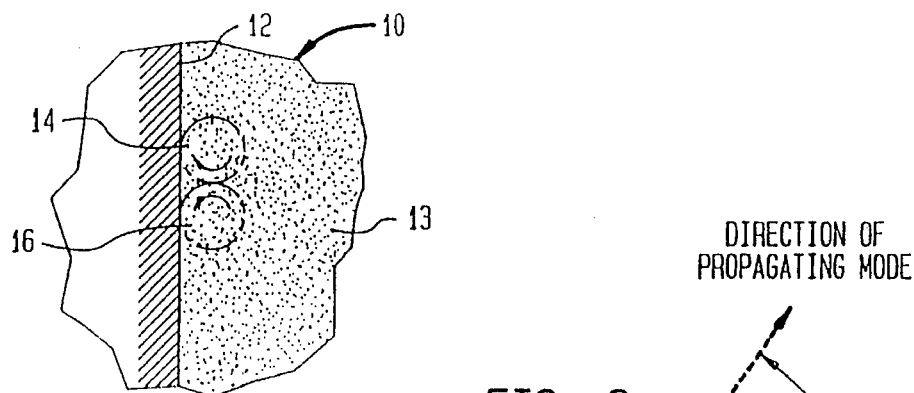
FIG. 1 is a cross-section showing wall-bounded fluid flow, where the cross-section is taken perpendicular to the direction of flow.
Figure 4:
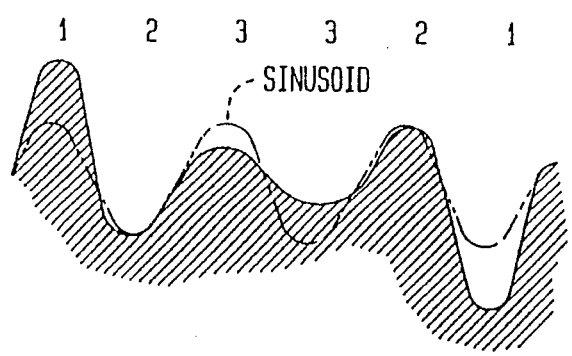
FIG. 4 is a modified version of the undulations.

Experimental evidence in support of this is shown in FIGS. 15a1–15a4 where the horizontal axis of each display is in the spanwise direction of the test sections shown in FIG. 10a–11b, i.e., perpendicular to the direction of flow, the vertical axis is distance from the bottom wall of the test section. Thus, the displays represent the velocity variations in the flow adjacent the wall of the test section through a section perpendicular to the flow. The gray level of the display is proportional to velocity where black represents zero velocity.

As shown in the displays of FIGS. 15a1–15a4, the application of a disturbance produced by sonic forcing in conjunction with a strip of delta-shaped protrusions results in an increase in the structure of the rolls as compared to the absence of sonic forcing.

The relevant parameters of both disturbances should be chosen so that the overall disturbance of the velocity field produces pairs of oblique waves in resonant interaction with the natural roll structure in order to disrupt the inherent interaction between the rolls and the propagating structures in the natural flow. This resonant interaction generally enhances the stability of the roll structures and can be designed so as to induce an increase in their lateral size thus decreasing the turbulent drag. This is because the enhanced roll structures form a layer of roll structures along the physical boundary of the body where the turbulent boundary layer is normally present. This layer inhibits the progress of turbulence towards the degradation of the motion into small scales and consequently permits higher velocities in the rest of this boundary layer. Other means are available for producing coupling of disturbances to the velocity field of the flow which generate an overall disturbance in the form of a pair of oblique waves in resonant.

In the previously described embodiments, when a single delta strip is used in conjunction with sound generators, the strip can be positioned upstream, downstream, or opposite the sound generators.

Figure 17:
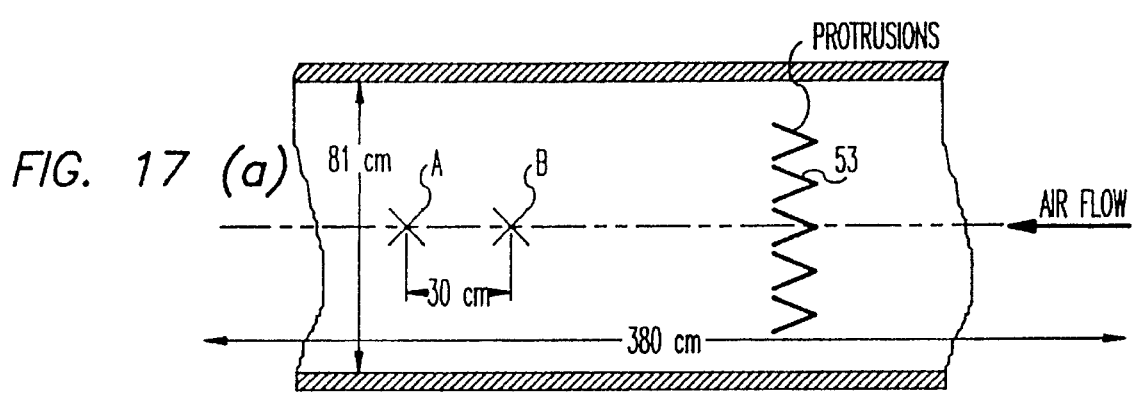
Figure 17:
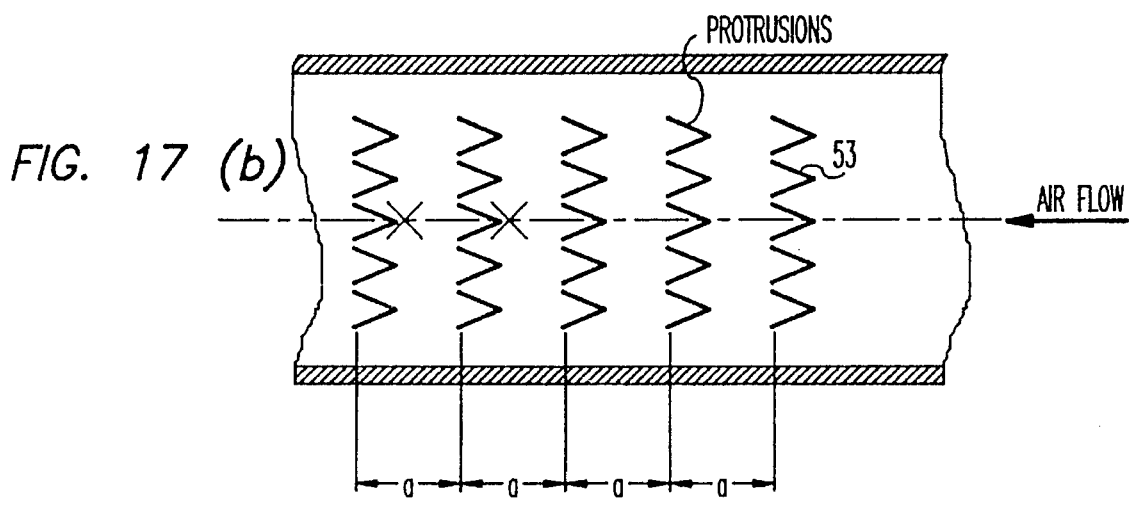

In a further embodiment, a single delta-strip, or an array of delta-strips, could be used without sonic generators as shown in FIG. 17. This is less effective than when sonic energy is used, but under some circumstances, it may be adequate.

Figure 16:
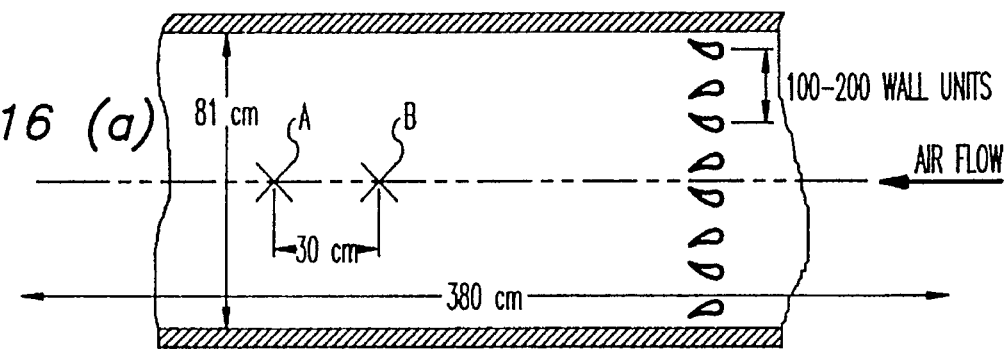
FIG. 16a is a modification of the linear strip of delta-shaped protrusions of the type shown in FIG. 10a and showing protrusions in the form of counter-lifting airfoils, each producing counter-rotating roll systems.
FIG. 16b is a modification of the spanwise array of linear strips of delta-shaped protrusions of the type shown in FIG.
Figure 16:
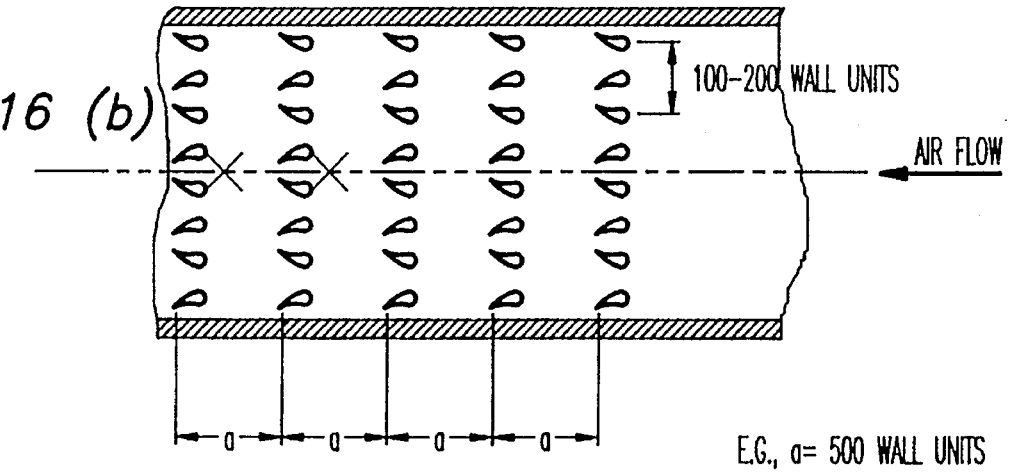

In a still further embodiment, strips of counter-lifting airfoil protrusions as shown in FIG. 16a can be used in place of a strip of delta-shaped protrusions. Each pair of such airfoil protrusions produces a pair of counter rotating rolls as a result of the tip vortices that emanate from a lifting foil. The airfoil pairs are ideally placed at roughly 100–200 wall units in order to produce the roll pairs in the flow. In the same way that FIG. 11 was extended to FIG. 12, an array of airfoil pairs can be assembled as shown in FIG. 16b. The rows of airfoil pairs should be placed at roughly 500 wall unit separations. The application shown in FIGS. 16a and 16b involve only passive flow inducers without the use of sound generators.

As indicated, the preferred spacing between adjacent foils in a strip is about 100–200 wall units, and the spacing between successive strips in an array of strips is about 500 wall units.

While airfoils are described and shown in FIGS. 16a and 16b, pairs of protrusions with other shapes can be used provided they produce pairs of counter rotating rolls. Moreover, the delta-shaped protrusions have a nominal angle of 45°.

In a still further embodiment, strips of embedded delta-shaped heating elements, or arrays of strips of embedded delta-shaped heating elements, as shown in FIGS. 19a and 19b can be used. Operating these heating elements in a time varying manner will produce a similar disturbance for enhancing the roll structures.

It is presently considered that the means for producing the disturbances would be used in conjunction with the flow to decrease the turbulent drag or increase the turbulent heat transfer as the case may require, e.g., positioning the means along the length of the wall of a pipeline, etc.

While the above described embodiments refer to loud speakers as the source of sonic energy, it should be understood that natural sources of sonic energy can be used. For example, sonic energy can be generated using aeolian tones or cavity resonators. Aeolian tones can be produced by the flow of fluid through, for example, ribbons or wires as indicated in FIG. 18, or by the flow of fluid past, for example, a blind cavity.

The advantages and improved results furnished by the method and apparatus of the present invention are apparent from the foregoing description of the preferred embodiment of the invention. Various changes and modifications may be made Without departing from the spirit and scope of the invention as described in the appended claims.

We claim:

1. A method for controlling turbulence in boundary layer or other wall-bounded fluid flow field having a turbulent wall region characterized by a system of roll pairs or steaks whose diameter is functionally related to the strength of the flow, and which extend in the direction of flow, and by propagating structures of coherent patterns that propagate obliquely to the direction of flow at a substantially constant group speed, said method including introducing into the turbulent wall region two separate disturbances that are effective in said region to produce a composite disturbance field that is strongly coupled to and modifies the obliquely propagating structures in a manner that increases or decreases the interaction of the propagating structures with the system of roll pairs for locally increasing or decreasing the turbulence in the flow field.

2. A method according to claim 1 wherein one disturbance results from the interaction of the fluid with a linear strip of delta-shaped protrusions on the wall extending transverse to the direction of flow.

3. A method according to claim 2 wherein a second disturbance results from injecting sonic energy into said region.

4. A method according to claim 1 wherein one disturbance results form the interaction of the fluid with an array of aligned streamwise spaced strips of delta-shaped protrusions positioned spanwise on the wall, each strip extending transverse to the direction of flow.

5. A method according to claim 4 wherein a second disturbance results from injecting sonic energy into said region.

6. A method according to claim 5 wherein said sonic energy is the result of sound generators that emit acoustic waves with different frequencies in a band of frequencies chosen to maximize the impact of the oblique waves on the organization and enhancement of said rolls.

7. A method according to claim 1 wherein said one disturbance results from the interaction of the fluid with a strip, or an array of strips, of delta-shaped heating elements spanwise embedded in the wall, and a second disturbance results from operating the heating elements in a time dependent manner so as to produce a composite disturbance in the flow field in the form of obliquely directed waves of heated fluid.

8. A method according to claim 3 wherein said sonic energy is in the form of acoustic waves with different frequencies in a band of frequencies chosen to maximize the impact of the oblique waves on the organization and enhancement of rolls.

9. A method for controlling turbulence in boundary-layer or other wall-bounded fluid flow fields having a turbulent wall region characterized by a system of roll pairs whose size is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with a linear strip of airfoil protrusions that forces production of roll pairs for enhancing the organization of the rolls thereby locally decreasing the turbulence and drag in the flow field.

10. A method for controlling turbulence in boundary layer or other wall-bounded fluid flow fields having a turbulent wall region characterized by a system of roll pairs whose size is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with an array of linear strips of airfoil protrusions that forces production of roll pairs for enhancing the organization of the rolls thereby thereby locally decreasing the turbulence and drag in the flow field.

11. A method for controlling turbulence in boundary layer or other wall-bounded fluid flow fields having a turbulent wall region characterized by a system of roll pairs whose diameter is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with a linear strip of delta shaped protrusions such that the disturbance is strongly coupled to and modifies the obliquely propagating structures in a manner that decreases the interaction of the propagating structures with the system of roll pairs for enhancing the organization of the rolls thereby thereby locally decreasing the turbulence and drag in the flow field.

12. A method for controlling turbulence in boundary layer or other wall-bounded fluid flow fields having a turbulent wall region characterized by a system of roll pairs whose diameter is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with a linear strip of embedded delta-shaped heating elements, and operating said heating elements in a time varying manner to create a disturbance that is strongly coupled to and modifies the obliquely propagating structures in a manner that decreases the interaction of the propagating structures with the system of roll pairs for enhancing the organization of the rolls thereby thereby locally decreasing the turbulence and drag in the flow field.

13. A method for controlling turbulence in boundary layer or other wall-bounded fluid flow fields having a turbulent wall region characterized by a system of roll pairs whose diameter is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with a linear strip of delta shaped protrusions such that the disturbance is strongly coupled to and modifies the obliquely propagating structures in a manner that increases or decreases the interaction of the propagating structures with the system of roll pairs for enhancing the organization of the rolls thereby thereby locally increasing or decreasing the turbulence and drag in the flow field.

14. A method for controlling turbulence in boundary layer or other wall-bounded fluid flow fields having a turbulent wall region characterized by a system of roll pairs whose diameter is functionally related to the strength of the flow, and which extend in the direction of flow, and by propagating structures of coherent patterns that propagate obliquely to the direction of flow at a substantially constant group speed, said method including introducing into the turbulent wall region a disturbance field resulting from the interaction of the fluid with an array of linear strips of delta shaped protrusions such that the disturbance is strongly coupled to and modifies the obliquely propagating structures in a manner that increases or decreases the interaction of the propagating structures with the system of roll pairs for enhancing the organization of the rolls thereby thereby locally increasing or decreasing the turbulence and drag in the flow field.

15. A method according to claim 13 wherein said disturbance is such that the interaction of the propagating structures with the system of roll pairs for enhancing the organization of rolls thereby locally increases turbulent heat transfer and mixing in the flow field.

16. A method according to claim 14 wherein said disturbance is such that the interaction of the propagating structures with the system of roll pairs for enhancing the organization of the rolls thereby locally increases turbulent heat transfer and mixing in the flow field.

17. Apparatus for controlling turbulence in a wall-bounded fluid flow field having a turbulent wall region characterized by a system of roll pairs or steaks whose diameter is functionally related to the strength of the flow, and which extend in the direction of flow, and by propagating structures of coherent patterns that propagate obliquely to the direction of flow at a substantially constant group speed, said apparatus comprising means for generating two separate disturbances that are effective in said region to produce a composite disturbance field that is strongly coupled to and modifies the obliquely propagating structures in a manner that increases or decreases the interaction of the propagating structures with the system of roll pairs for enhancing the organization of the rolls thereby locally increasing or decreasing the turbulence in the flow field.

18. Apparatus according to claim 17 wherein said means includes a linear strip, or an array of strips, of delta-shaped protrusions on the wall extending transverse to the direction of flow, and one or more sound generators mounted on the wall.

19. Apparatus according to claim 17 wherein said means includes a linear strip, or an array of strips, of delta-shaped heating elements spanwise embedded in the wall and protruding into the flow, and means for operating the heating elements in a time-dependent manner.

20. Apparatus according to claim 17 wherein said means includes a linear strip of protrusions on the wall extending transverse to the direction of flow, and being configured as pairs of counter-lifting fluid foils, each pair of foils adapted to interact with the fluid for producing a pair of counter rotating rolls.

21. Apparatus for controlling turbulence in boundary layer or other wall-bounded fluid flow fields having a turbulent wall region characterized by a system of roll pairs whose size is functionally related to the strength of the flow, and which extend in the direction of flow, and by propagating structures of coherent patterns that propagate obliquely to the direction of flow at a substantially constant group speed, said apparatus including a linear strip of airfoil protrusions for introducing into the turbulent wall region a disturbance field resulting from the interaction of the fluid with the airfoil protrusions, said protrusions being such that said disturbance field forces production of roll pairs for enhancing the organization of the rolls thereby thereby locally decreasing the turbulence and drag in the flow field.

22. An apparatus for controlling turbulence in boundary layer or other wall-bounded fluid flow fields having a turbulent wall region characterized by a system of roll pairs whose size is functionally related to the strength of the flow, and which extend in the direction of flow, and by propagating structures of coherent patterns that propagate obliquely to the direction of flow at a substantially constant group speed, said apparatus including an array of linear strips of airfoil protrusions for introducing into the turbulent wall region a disturbance field resulting from the interaction of the fluid with said array, said protrusions and said array being such at to force production of roll pairs for enhancing the organization of the rolls thereby thereby locally decreasing the turbulence and drag in the flow field.

* * * * *